United States Patent [19]
Kroll

[11] 3,805,494
[45] Apr. 23, 1974

[54] DEVICE FOR CLEANING POUCH-LIKE FILTERS

[76] Inventor: Gert Kroll, Bayemstrasse 18, Hoesel, Germany

[22] Filed: Aug. 21, 1973

[21] Appl. No.: 390,223

Related U.S. Application Data

[63] Continuation of Ser. No. 240,126, March 31, 1972, abandoned, Continuation-in-part of Ser. No. 879,325, Nov. 24, 1969.

[52] U.S. Cl. .................................. 55/300, 55/304
[51] Int. Cl. ...................... B01d 29/38, B01d 46/04
[58] Field of Search .............................. 55/300, 304

[56] References Cited
UNITED STATES PATENTS

| | | |
|---|---|---|
| 3,636,680 | 1/1972 | Seidel .............................. 55/304 X |
| 1,268,304 | 6/1918 | Warren ................................. 55/300 |
| 1,868,876 | 7/1932 | Boesger .............................. 55/300 |
| 2,167,236 | 7/1939 | Gieselem ............................. 55/304 |
| 2,072,906 | 3/1937 | Rosenberger ........................ 55/300 |
| 3,545,178 | 12/1970 | Sheehan ........................... 55/300 X |

*Primary Examiner*—John Adee
*Attorney, Agent, or Firm*—Malcolm W. Fraser

[57] ABSTRACT

A device for cleaning pouch-type filters and pouches of which are associated with one or more slotted walls within a housing, the device comprising an agitating mechanism for acting upon the slotted wall to effect agitation in the same plane, and buffer of resilient material which is located between the slotted wall and the housing.

2 Claims, 3 Drawing Figures

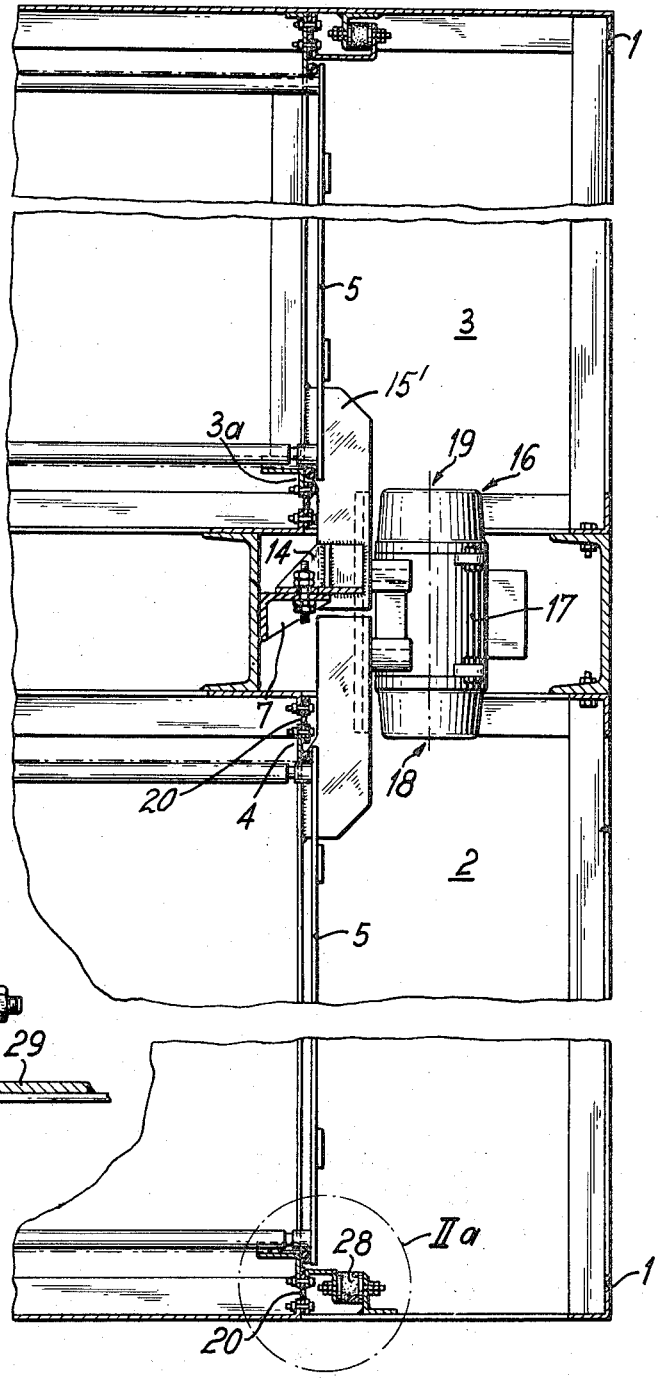

DEVICE FOR CLEANING POUCH-LIKE FILTERS

CROSS REFERENCE TO RELATED APPLICATION

This is a continuation of application Ser. No. 240,126, filed Mar. 31, 1972 now abandoned, which was a continuation-in-part of the application of Gert Kroll, Ser. No. 879,325, filed Nov. 24, 1969, and entitled DEVICE FOR CLEANING POUCH-TYPE FILTERS.

BACKGROUND OF THE INVENTION

This invention relates to a device for the cleaning of pouch-type filters, the filtering pouches of which are associated with one or more slotted walls and are accommodated in a housing.

In general, the difficulty of cleaning off the dust particles retained in the filtering material, and the frequency and means with which the cleaning procedure have to be effected, depend on the type of filtered dust that has to be disengaged. In the case of highly adhesive dusts, it is desirable to make it possible to carry out the cleaning procedure effectively but with only small expenditure on equipment.

The filtering material can undergo a beating action, so that the dust particles drop off. In contrast with this, it is more effective to use infiltrated air, so that the cleaning off of the dust particles from the filtering media takes place with the assistance of air. More obstinate dust particles can then be cleaned off jointly by a beating action and by blowing, in certain circumstances with the employment of special scavenging air blowers. Finally, the scavenging air can be supplied in a pulsating stream, and in this way it achieves an additional cleaning effect.

SUMMARY OF THE INVENTION

In the case of pouch-type filters, the invention has for its object to provide increased efficiency in the cleaning effect by subjecting them to vibratory agitation in a unique manner.

Accoring to the invention, an agitating mechanism is provided to act on the slotted walls to effect filter agitation in the same plane, and also buffers of elastomeric material are provided between the slotted walls and the housing.

The resilient mounting of the slotted walls in the housing renders it possible to impart oscillations to the slotted walls in the same plane through the assistance of the agitating mechanism, these oscillations being capable of application along with the other types of cleaning referred to above, and considerably adding to the effect of the latter.

A special agitating mechanism can be provided for each slotted wall; it is, however, more useful, in accordance with a further feature of the invention, to employ one agitating mechanism for several adjacent slotted walls. In this case the agitating mechanism may be applied to the slotted walls of an upper and a lower row of pouch-type filters. In this event, it will be useful to attach the agitating mechanism to an intermediate frame connecting the said two slotted walls to each other.

It is convenient for the buffers between the slotted walls and the housing to include strip-shaped seals fastened to the housing and the slotted walls with the aid of screws. This seal, which in itself is indispensible for the proper operation of the pouch-type filter, assists in the task performed by the buffers, and the screw connection enables the detachable fastening of the seals to the slotted walls respectively.

BRIEF DESCRIPTION OF THE DRAWINGS

The invention is described hereinafter in greater detail with reference to the accompanying drawings, in which:

FIG. 2 shows a side view of the arrangement according to FIG. 1; and

FIG. 2a is an enlarged fragmentary section view showing the connection between a row of filters and the housing.

DESCRIPTION OF THE EMBODIMENT

Figure 1:
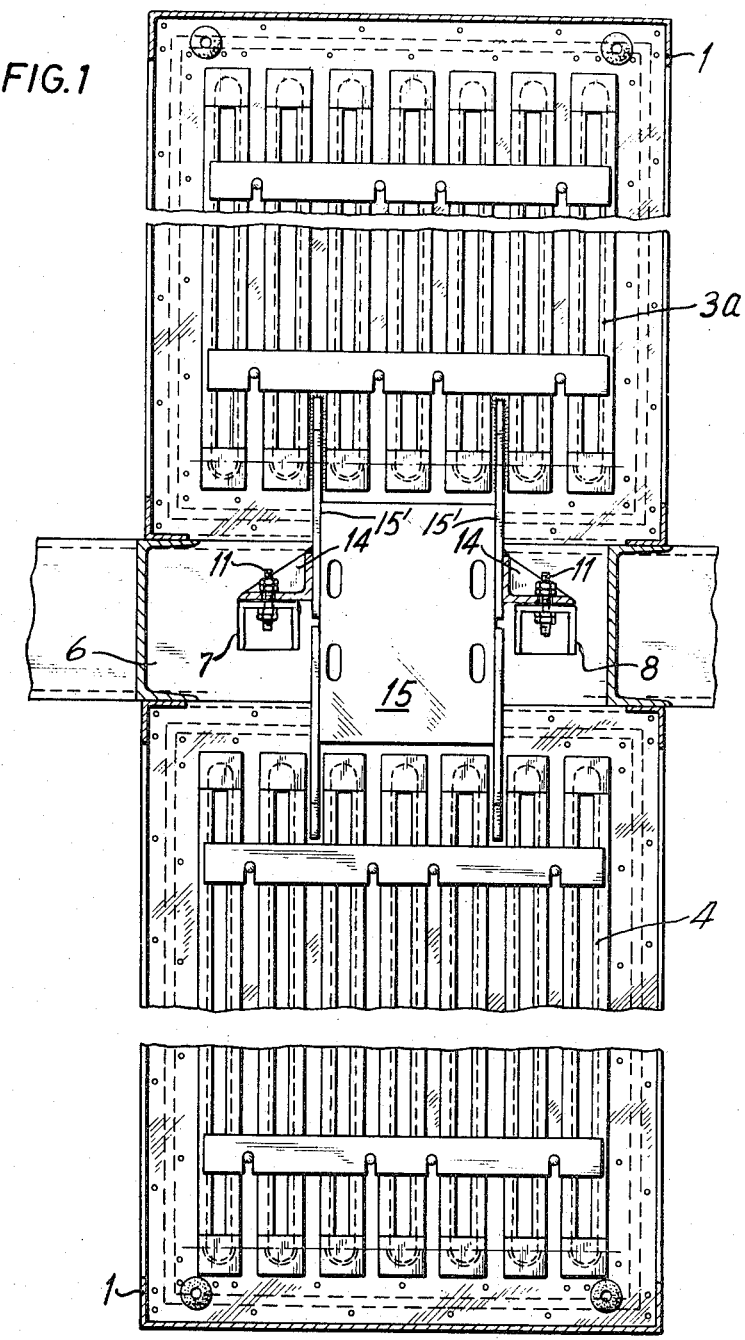
FIG. 1 shows, seen from the front, a pouch-type filter arrangement with a plurality of filtering pouches cleanable in accordance with the invention.

The filter shown in the drawings has a housing 1 made of thin sheet metal, in which two filtering chambers 2 and 3 are formed. According to this example of embodiment, in the filtering chambers are located seven pouch-type filters, which are associated with slotted walls, which can be seen at 3a and 4, respectively. Each filter has a front slotted wall 3a or 4, as the case may be, to which is connected a frame 5 over which a filter cloth is drawn.

In the housing between the filtering chambers 2 and 3 is located an intermediate frame 6 which along one of its sides possesses angle brackets 7 and 8, respectively. The brackets 7 and 8 are rigidly secured to brackets 14 respectively, which are fixed to the rigid side flanges 15' of a supporting plate 15. The agitating mechanism 16 for imparting oscillating and agitating movement to the filters is fixedly mounted on the plate 15. As shown, the supporting plate flanges 15' project above and below beyond the upper and lower edges of the plate and are welded in place so that agitation of the supporting plate 15 is concomitantly imparted to both rows of filters.

The agitating mechanism consists of an electric motor accommodated in a housing 17, the rotor shaft of the motor being provided at the two ends 18 and 19 with screwed-on eccentric discs, which effect oscillatory agitating movement in the same plane to the various filters.

The slotted walls 3a and 4 of each filter are provided with flexible connecting strips 20 which are fastened in place with the aid of screws 24 and 25, respectively, and these strips establish sealing connections between the filters and the housing 1. The screws 24 also act to connect an angle bracket 26, which in each case is connected through screws 27 with elastomeric buffers 28, and also through a bracket 29 with the housing 1.

Immediately when the motor in the housing 16 is set in motion, there occurs an oscillating movement in the same plane brought about by the eccentric discs, and this movement transmits agitation to the frames and filters. The filters are continuously agitated as a result of the oscillating movement in the same plane, which emipirically is found to establish an effective dust removal operation from the respective filter cloths. In the form shown, the vibratory agitation of the filters would be in a plane extending from right to left of FIG. 2.

The above arrangement can be employed together with a conventional arrangement involving scavenging air, the latter arrangement, however, not being reproduced in the drawings.

What I claim is:

1. In a filter apparatus comprising a housing and a filter unit within said housing having a slotted wall and a frame over which a filter cloth is drawn, the improved mechanism for agitating the filter unit with respect to the housing in a plane perpendicular to the slotted wall comprising A. an electric motor comprising a housing (17) and a rotor shaft having eccentric discs (18 and 19) mounted on the ends thereof to cause the motor to oscillate when in operation, B. means (7, 8, 14, 15, 15') mechanically effected by the oscillation of the motor for causing oscillation of the frame (5) in the plane of the filter cloth, and C. elastomeric buffer means (28) connected between the housing (1) and the frame (5) to buffer the oscillation of the frame caused by the motor.

2. A filter apparatus as claimed in claim 1, comprising an intermediate frame in said housing, a filter series below said frame, flexible connection between the adjacent ends of said filter series and said frame respectively, rigid side flanges on the upper and lower ends of said plate respectively, and rigid connections between said said flanges and said filter series respectively, whereby similar oscillatory agitating movement in the same plane is imparted to both filter series.

* * * * *